United States Patent [19]
Darbee et al.

[11] Patent Number: 6,002,450
[45] Date of Patent: Dec. 14, 1999

[54] TWO-WAY REMOTE CONTROL WITH ADVERTISING DISPLAY

[75] Inventors: Paul Darbee, Santa Ana; Brandt Thompson, Newport Coast; Frank O'Donnell, Irvine, all of Calif.

[73] Assignee: Evolve Products, Inc., Irvine, Calif.

[21] Appl. No.: 08/999,716

[22] Filed: Oct. 6, 1997

Related U.S. Application Data

[63] Continuation-in-part of application No. 08/823,507, Mar. 24, 1997, abandoned.

[51] Int. Cl.⁶ ..................................................... H04N 5/44
[52] U.S. Cl. ..................................... 348/734; 340/825.72
[58] Field of Search ..................................... 348/734, 725; 345/327, 328; 340/825.69, 825.72; 341/176; H04N 5/44

[56] References Cited

U.S. PATENT DOCUMENTS

| | | |
|---|---|---|
| 4,888,709 | 12/1989 | Revesz et al. . |
| 4,959,810 | 9/1990 | Darbee . |
| 4,962,466 | 10/1990 | Revesz et al. . |
| 5,204,768 | 4/1993 | Teakiris et al. . |
| 5,249,044 | 9/1993 | Von Kohorn . |
| 5,285,278 | 2/1994 | Holman . |
| 5,287,181 | 2/1994 | Holman . |
| 5,355,480 | 10/1994 | Smith et al. . |
| 5,396,546 | 3/1995 | Remillard . |
| 5,404,393 | 4/1995 | Remillard . |
| 5,406,558 | 4/1995 | Rovira et al. ........................... 348/734 |
| 5,410,326 | 4/1995 | Goldstein . |
| 5,416,535 | 5/1995 | Sato et al. . |
| 5,450,079 | 9/1995 | Dunaway . |
| 5,455,570 | 10/1995 | Cook et al. . |
| 5,461,667 | 10/1995 | Remillard . |
| 5,497,185 | 3/1996 | Dufresne et al. . |
| 5,500,691 | 3/1996 | Martin et al. . |
| 5,502,504 | 3/1996 | Marshall et al. . |
| 5,504,475 | 4/1996 | Houdou et al. . |
| 5,510,828 | 4/1996 | Lutterbach et al. . |
| 5,532,689 | 7/1996 | Bueno . |
| 5,537,106 | 7/1996 | Mitsuhashi ........................ 340/825.72 |
| 5,537,107 | 7/1996 | Funado ............................... 340/825.72 |
| 5,537,463 | 7/1996 | Escobosa et al. . |
| 5,539,393 | 7/1996 | Barfod . |
| 5,552,837 | 9/1996 | Mankovitz . |
| 5,566,353 | 10/1996 | Cho et al. . |
| 5,568,367 | 10/1996 | Park . |
| 5,576,768 | 11/1996 | Gomikawa . |

(List continued on next page.)

FOREIGN PATENT DOCUMENTS

| | | |
|---|---|---|
| WO 93/12612 | 6/1993 | WIPO . |
| WO9312612 | 6/1993 | WIPO . |
| WO 93/19427 | 9/1993 | WIPO . |
| WO9319427 | 9/1993 | WIPO . |
| WO 94/15417 | 7/1994 | WIPO . |
| WO9415417 | 7/1994 | WIPO . |
| WO 95/01056 | 1/1995 | WIPO . |
| WO 95/01058 | 1/1995 | WIPO . |
| WO 95/01059 | 1/1995 | WIPO . |
| WO 95/101057 | 1/1995 | WIPO . |
| WO9501056 | 1/1995 | WIPO . |
| WO9501057 | 1/1995 | WIPO . |
| WO9501058 | 1/1995 | WIPO . |
| WO9501059 | 1/1995 | WIPO . |
| WO 95/32538 | 11/1995 | WIPO . |
| WO9532583 | 11/1995 | WIPO . |
| WO 96 30864 | 10/1996 | WIPO ........................... G06K 13/00 |

*Primary Examiner*—Chris Grant
*Attorney, Agent, or Firm*—Thomas R. Vigil

[57] ABSTRACT

The remote control includes a visual display, first wireless circuitry for receiving from a host device data in the form of selected information, e.g., an advertisement, to be displayed, stored or processed, second wireless circuitry for sending information, control circuitry and software for controlling operation of the remote control, and the software including and a display default routine for returning to the display the display of the selected information received by the first wireless circuitry.

7 Claims, 10 Drawing Sheets

U.S. PATENT DOCUMENTS

| | | |
|---|---|---|
| 5,583,491 | 12/1996 | Kim . |
| 5,603,078 | 2/1997 | Henderson et al. . |
| 5,604,923 | 2/1997 | Wilkus . |
| 5,625,608 | 4/1997 | Grewe et al. ............................. 369/24 |
| 5,646,608 | 7/1997 | Shintani . |
| 5,684,526 | 11/1997 | Yoshinobu . |
| 5,737,028 | 4/1998 | Bertram et al. . |
| 5,774,172 | 6/1998 | Kapell et al. . |
| 5,850,340 | 12/1998 | York . |
| 5,870,155 | 2/1999 | Erlin . |
| 5,883,680 | 3/1999 | Nykerk .................................... 348/734 |

TWO-WAY REMOTE CONTROL WITH ADVERTISING DISPLAY

CROSS-REFERENCE TO RELATED APPLICATIONS

This application is a continuation-in-part application of U.S. application Ser. No. 08/823,507, filed Mar. 24, 1997, now abandoned.

BACKGROUND OF THE INVENTION

1. Field of the Invention

The present invention relates to an interactive two-way remote control having an advertising display on a visual display of the remote control and circuitry for maintaining the advertising display on the visual display when the remote control is in a quiescent state.

2. Description of the related art including information disclosed under 37 CFR §§ 1.97–1.99.

Hand held remote controls are normally battery operated devices capable of sending control commands wirelessly (using IR or RF) in one direction only, from the handset to the controlled device. Even when the handset is fitted with a display, the display typically is used only for enhancing the user interface on the remote control itself, for instance in displaying the status of the remote control or aiding in initial setup of the remote control.

Heretofore, various systems have been proposed for the remote display of information, such as the display of prices on the edge of a shelf in a supermarket or information on the screen of a television set. Also, there have been proposed remote control devices including key back-lighting, credit card and smart card readers and built in modems or adapters for communicating with a modem. Several examples of such previously proposed remote control devices and remote display systems are disclosed in the following U.S. Patents:

| U.S. Pat. No. | Patentee |
| --- | --- |
| 4,888,709 | Revesz et al. |
| 4,959,810 | Darbee |
| 4,962,466 | Revesz et al. |
| 5,204,768 | Tsakiris et al. |
| 5,249,044 | Von Kohorn |
| 5,285,278 | Holman |
| 5,287,181 | Holman |
| 5,355,480 | Smith et al. |
| 5,396,546 | Remillard |
| 5,404,393 | Remillard |
| 5,410,326 | Goldstein |
| 5,416,535 | Sato et al. |
| 5,450,079 | Dunaway |
| 5,455,570 | Cook et al. |
| 5,461,667 | Remillard |
| 5,497,185 | Dufresne et al. |
| 5,502,504 | Marshall et al. |
| 5,504,475 | Houdou et al. |
| 5,532,689 | Bueno |
| 5,537,107 | Furnado |
| 5,537,463 | Escobosa et al. |
| 5,539,393 | Barfod |
| 5,552,837 | Mankovitz |
| 5,566,353 | Cho et al. |
| 5,568,367 | Park |
| 5,603,078 | Henderson et al. |
| 5,576,768 | Gomikawa |
| 5,604,923 | Wilkus |

| PCT Patent Publication | Applicant |
| --- | --- |
| WO 93/12612 | Yuen at al. |
| WO 93/19427 | Singer st al. |
| WO 94/15417 | Minimetrics Limited |
| WO 95/32583 | TV Guide On Screen |
| WO 95/01056 | Apple Computer, Inc. |
| WO 95/01057 | Apple Computer, Inc. |
| WO 95/01058 | Apple Computer, Inc. |
| WO 95/01059 | Apple Computer, Inc. |

Two way data coupling in a remote control is disclosed in the Darbee et al. U.S. Pat. No. 4,959,810.

The Tsakiris et al. U.S. Pat. No. 5,204,768 discloses a remote controlled electronic presentation system including a wireless remote control which includes an infrared receiver and an infrared transmitter for communicating with a remote transceiver coupled to a computer.

The Smith et al. U.S. Pat. No. 5,355,480 discloses an interactive terminal which is coupled via two-way RF communication to a central location designated as the system manager. A key pad which may be directly coupled via an infrared remote control transmission link receiver is actuated to cause a prompting screen to be displayed on a television set.

The Remillard U.S. Pat. Nos. 5,396,546, 5,404,393 and 5,461,667 are directed to an electronic device and method for accessing remote electronic facilities and displaying information retrieved from the remote electronic facility on a conventional television set including a host computer connected to a television set and to a telephone line. An electronic device interface is coupled between the television set and the host computer and facilitates display of retrieved data on the television set under the operation of a remote key pad control having keys for initiating the sending of menu selection signals to the electronic device interface.

The Goldstein U.S. Pat. No. 5,410,326 discloses a programmable remote control device for interacting with a plurality of remotely controlled devices, including an optical input, an IR input and an audio input for transferring embedded data in a television broadcast to the remote control device. The remote control has an FM bi-directional communication link to a telephone interface which can be radio frequency coupled to a television set or to a telephone line or a power line. The remote control has a visual display and advertising can be displayed on the visual display.

The Dunaway U.S. Pat. No. 5,450,079 discloses a multimodal hand-held remote control device including a IR transmitter and an IR receiver and/or RS 232 interface for transmitting data to and receiving data from a controlled multimedia or host.

The Cook et al. U.S. Pat. No. 5,455,550 discloses a method and apparatus for communication of program data via a remote control unit including a remote control having an RF receiver and an RF transmitter for communicating with a digital music tuner.

The Marshall et al. U.S. Pat. No. 5,502,504 discloses a video mix program guide stored in a computer and having an infrared radio frequency receiver. A viewer sends commands to the receiver to control operation of the computer by use of an infrared or radio frequency remote control transmitter.

The Apple Computer, Inc. PCT Patent Publication Nos. WO 95/01057, WO 95/01056, WO 95/01058 and WO 95/01059 disclose an interactive audio-visual (AV) transceiver coupled to a television set and/or a telephone cable.

A remote control device is provided for communication with the AV transceiver to interactively manage selection of program and service sources. The remote control device sends and receives wireless (IR) control signals to and from an IR control unit and the audio-visual transceiver.

The Minimetrics Limited PCT Patent Publication No. WO 94/15417 discloses a combined remote control and data logging unit for use as a market research tool and includes a transceiver comprising infrared input and an infrared output.

SUMMARY OF THE INVENTION

The present invention is directed to a remote control with a display which is capable of wirelessly (via IR or RF) receiving information. Receiving information for updating remote control codes is taught in the Darbee et al. U.S. Pat. No. 4,959,810. The present invention receives information for the purpose of advertising on the remote control. The advantage is that, in contrast to a television, the display on the remote control can always be on, meaning that the remote control can act as a coffee-table billboard, touting pay-per-view events, products, services, coupon offers or any other advertising offers.

The advertising message on the remote control is an information payload, in the sense that an advertiser can be charged for time on the remote control's screen. It is important, therefore, that the entire display be available for the payload message as much of the time as possible. The present invention uses a timer in the remote control to display the payload message within a certain interval after the user is finished using the remote control to control equipment.

One embodiment of the invention uses a motion detector to determine if the user has picked up the remote control, at which time a popup overlay of the payload message can indicate the current status of the remote control. Such time- and space-sharing of the remote control's screen maximizes the exposure of the advertising message to the user.

When the remote control is used in conjunction with interactive applications running on a television settop box, the TV itself, or a computer, it is often important that interactive advertising offers appearing during commercial program breaks not extend into the program proper. In this case, the display of the remote control can extend the time available to the user to respond to interactive offers by "trailing" the offer to the remote control's screen after the interactive ad has disappeared from the TV (or PC) screen and regular programming has resumed.

Many systems which a remote control can control are two-way themselves, meaning that information originating from the user can be read by or delivered to a "head end." Such systems allow transactions by the user, such as responses to advertising offers, merely by pressing a button on the remote control. In conjunction with such two-way media, the advertising offers can appear on the same remote control that generates a user response, thus bypassing the TV or PC as a display device.

In the case where the delivery medium for advertising to the remote control is not two-way, a "bypass" system can be provided for return signals to a central computer. For instance, a low-cost radio transmitter in the remote control can send data to an autodialer modem connected to the user's phone line. User responses to advertising offers can then be sent by phone to a central computer.

Cable, satellite, or broadcast TV are the normal means for transporting information to the remote control, using receiving circuitry in the settop box or the TV itself, along with an IR or RF wireless link to the remote control. However, bypass of the cable, satellite, or broadcast TV downstream link to the remote control is also possible, using a paging network, FM SCA data on a radio station, a modem with a wireless link to the remote control, or a wireless link to a computer which is in turn connected to a remote network.

The fact that the display on the remote control can always be active and readable, whether or not the TV or PC are turned on, is an important extension of the exposure of the user to advertising offers.

To accommodate the narrow bandwidth usually available on the wireless link between the sending device and the remote control, images can be compressed before being sent to the remote control. Either the bitmapped images can be compressed using any one of several well-known compression algorithms, such as JPEG, or drawing commands can be sent to a GDI (graphics device interface) running in the remote control.

By allowing the remote control to receive executable code as well as static images, the remote control can display animated graphics, run interactive sessions with the user, or upgrade its own software to enhance its usefulness.

Thus, according to the present invention there is provided a remote control including a visual display, first wireless circuitry for receiving from a host device data including selected information to be displayed, second wireless circuitry for sending information, control circuitry and software for controlling operation of the remote control, and the software including a timeout routine and a display default routine for returning to the display the display of selected information received by the first wireless circuitry.

DESCRIPTION OF THE PREFERRED EMBODIMENT(S)

Figure 1:
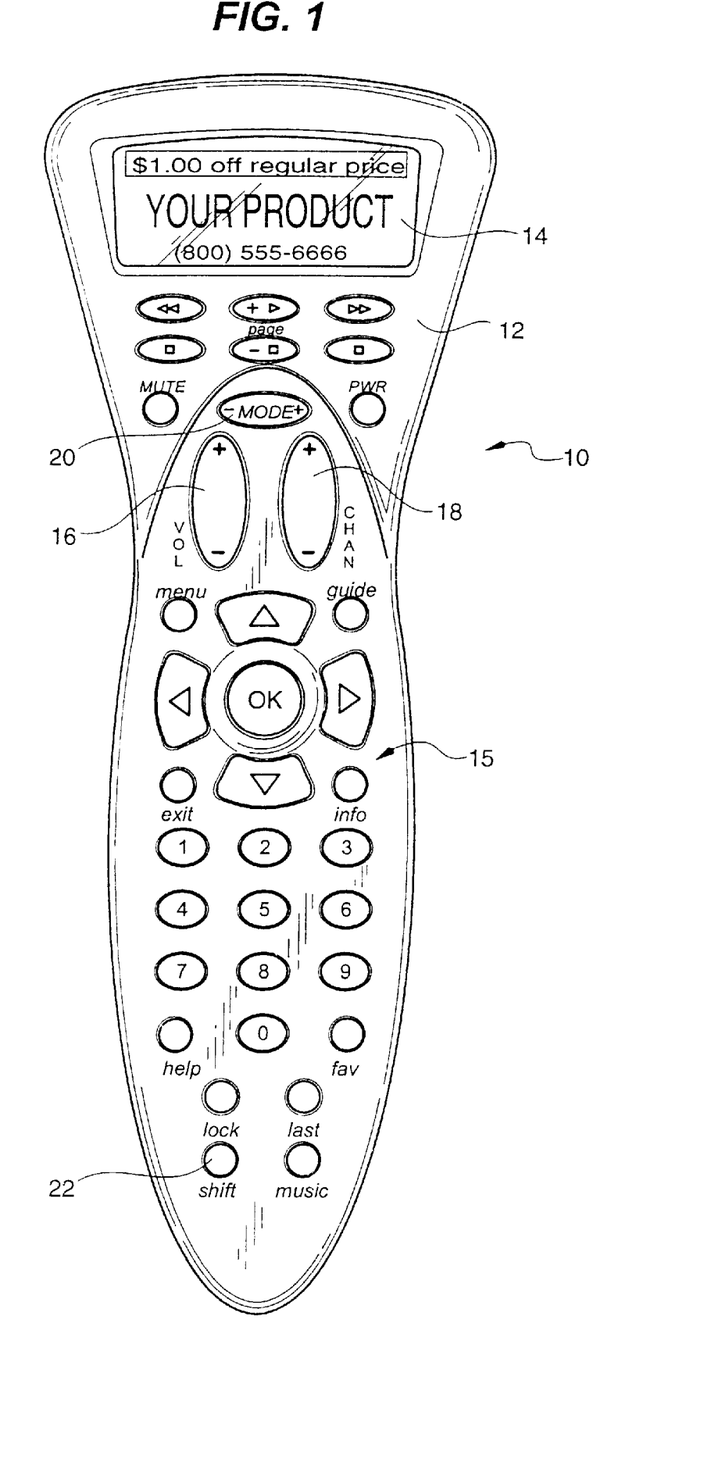
FIG. 1 is a top plan view of a remote control constructed according to the teachings of the present invention and having a visual display for displaying an advertisement.

Referring now to FIG. 1 in greater detail, there is illustrated therein a remote control 10 constructed according to the teachings of the present invention which includes, on a top panel 12 thereof an LCD visual display 14, and a keyboard 15 including a volume Up and Down button 16, a channel Up and Down button 18, a MODE button 20, and a SHIFT button 22, among others.

Figure 2:
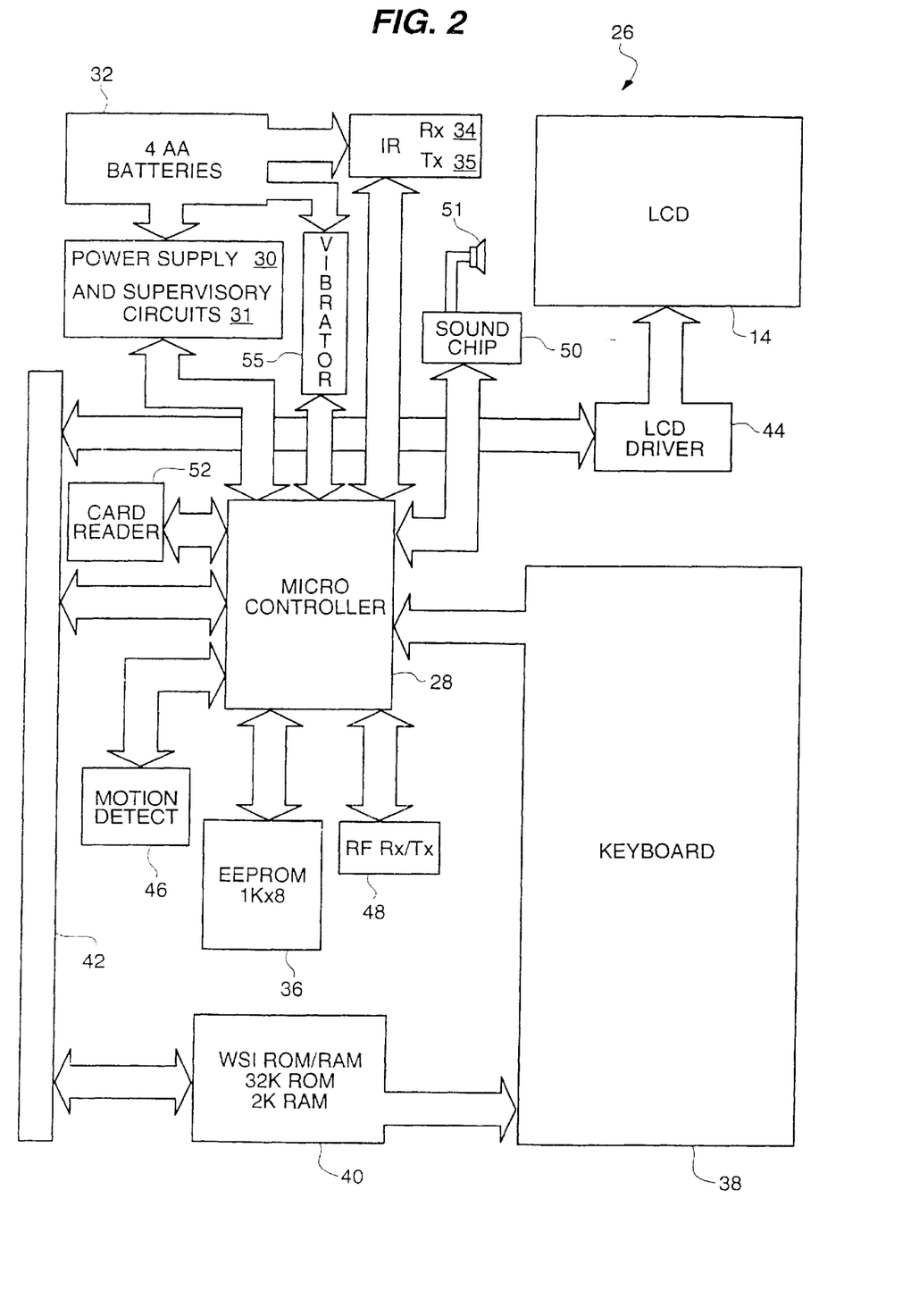
FIG. 2 is a block schematic diagram of the electrical circuitry for the remote control shown in FIG. 1.
Figure 3A:
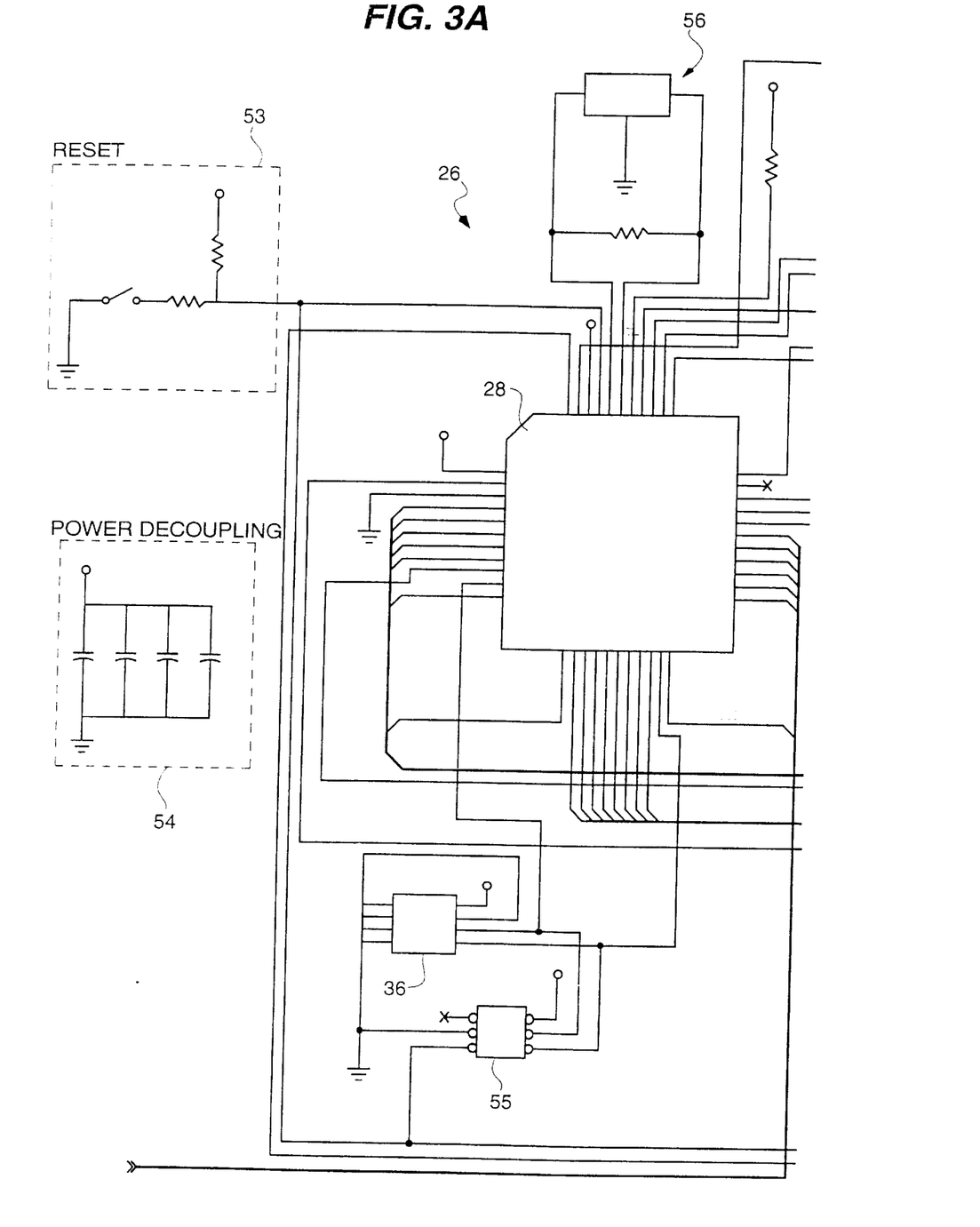
FIGS. 3A–3D are a more detailed electrical schematic circuit diagram of the electrical circuitry shown in FIG. 2.
Figure 3B:
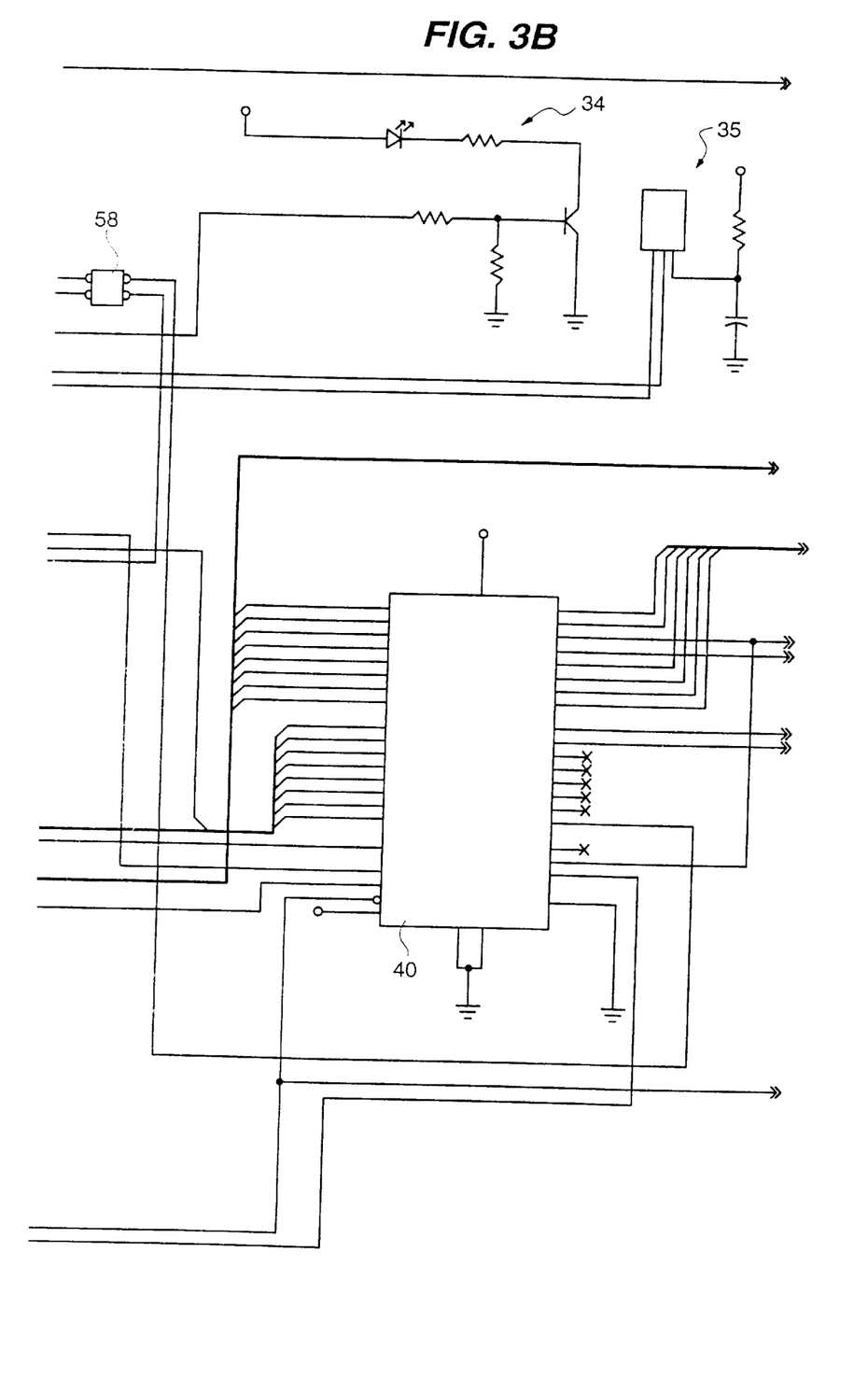
Figure 3C:
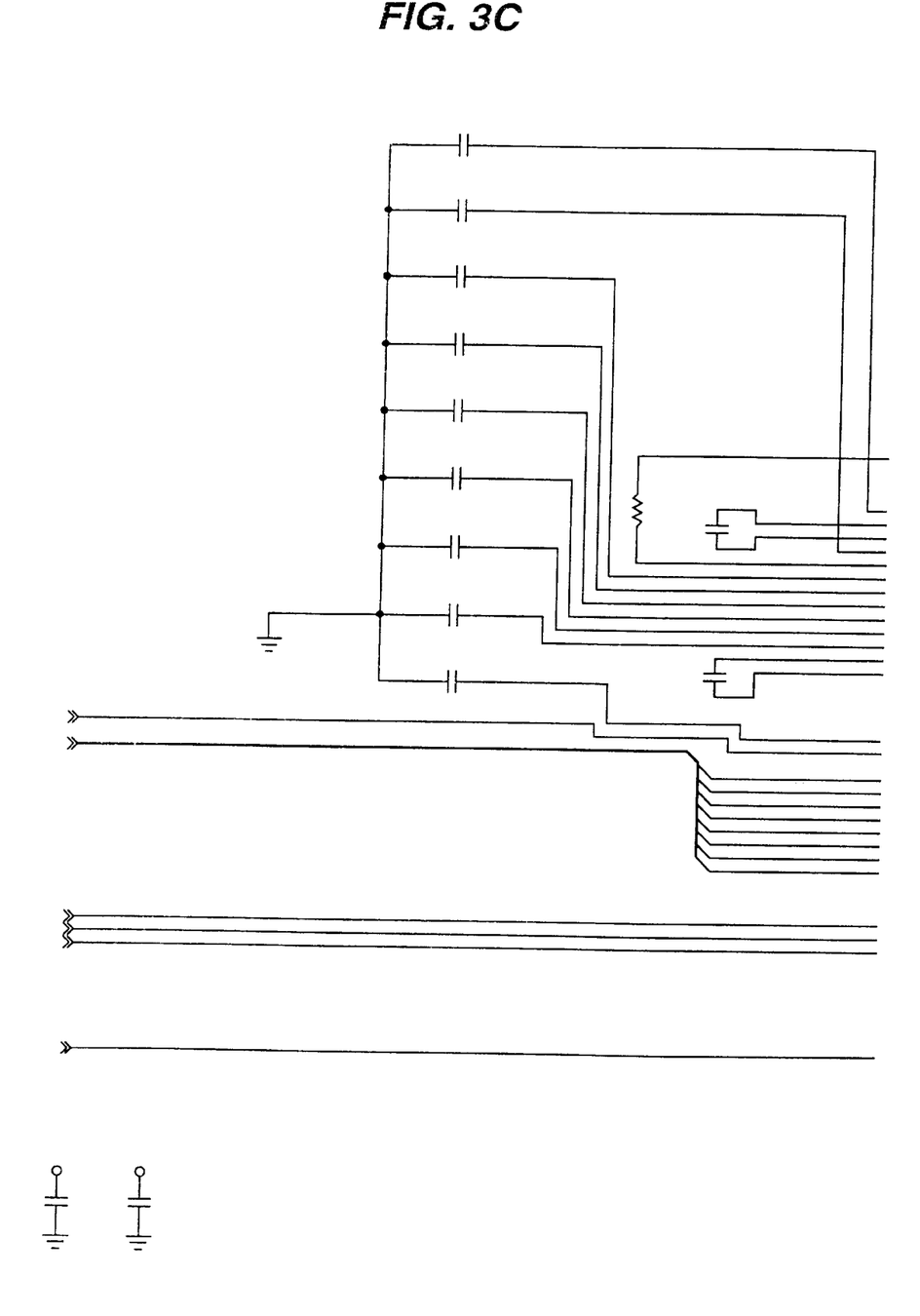
Figure 3D:
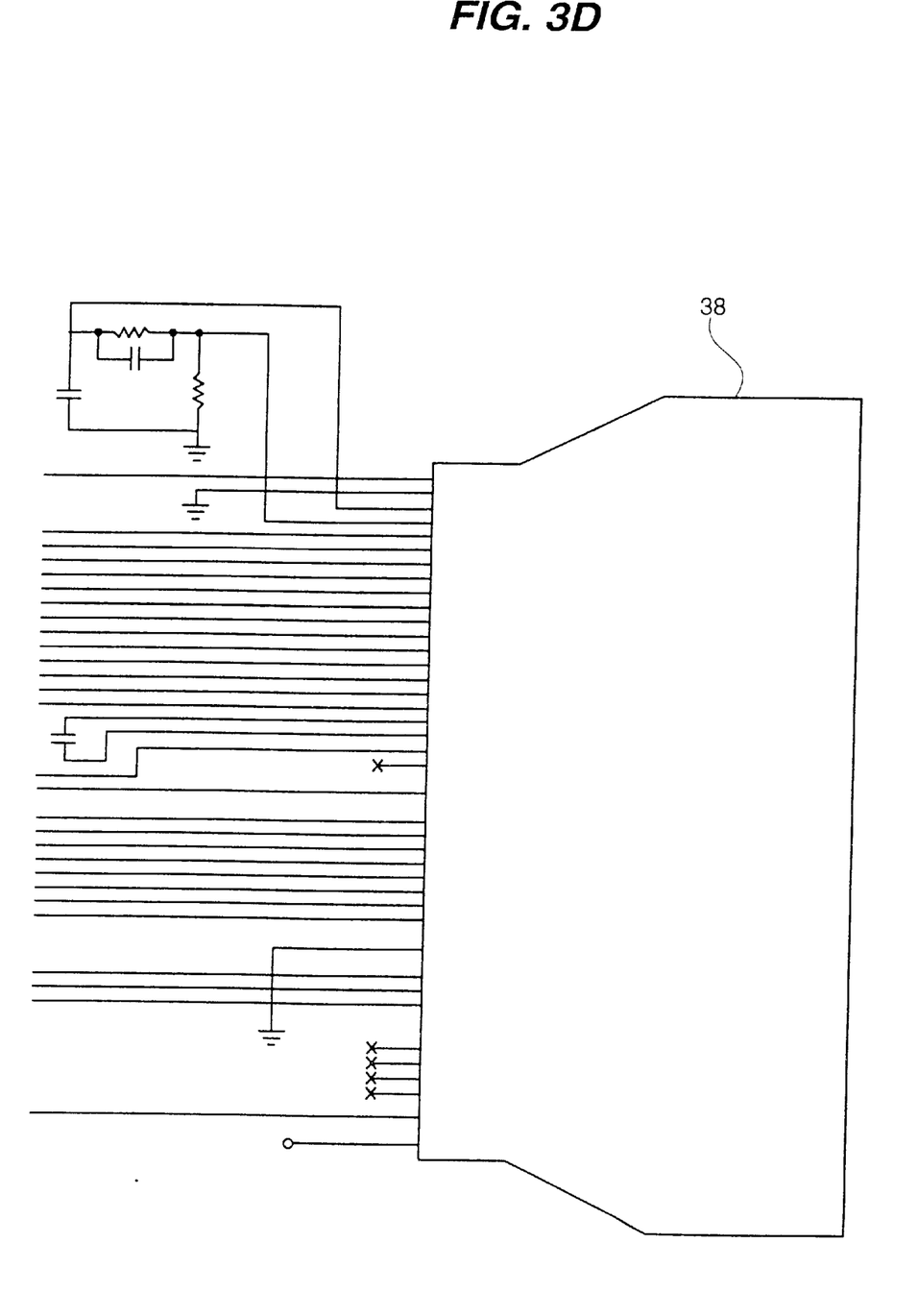
Figure 4:
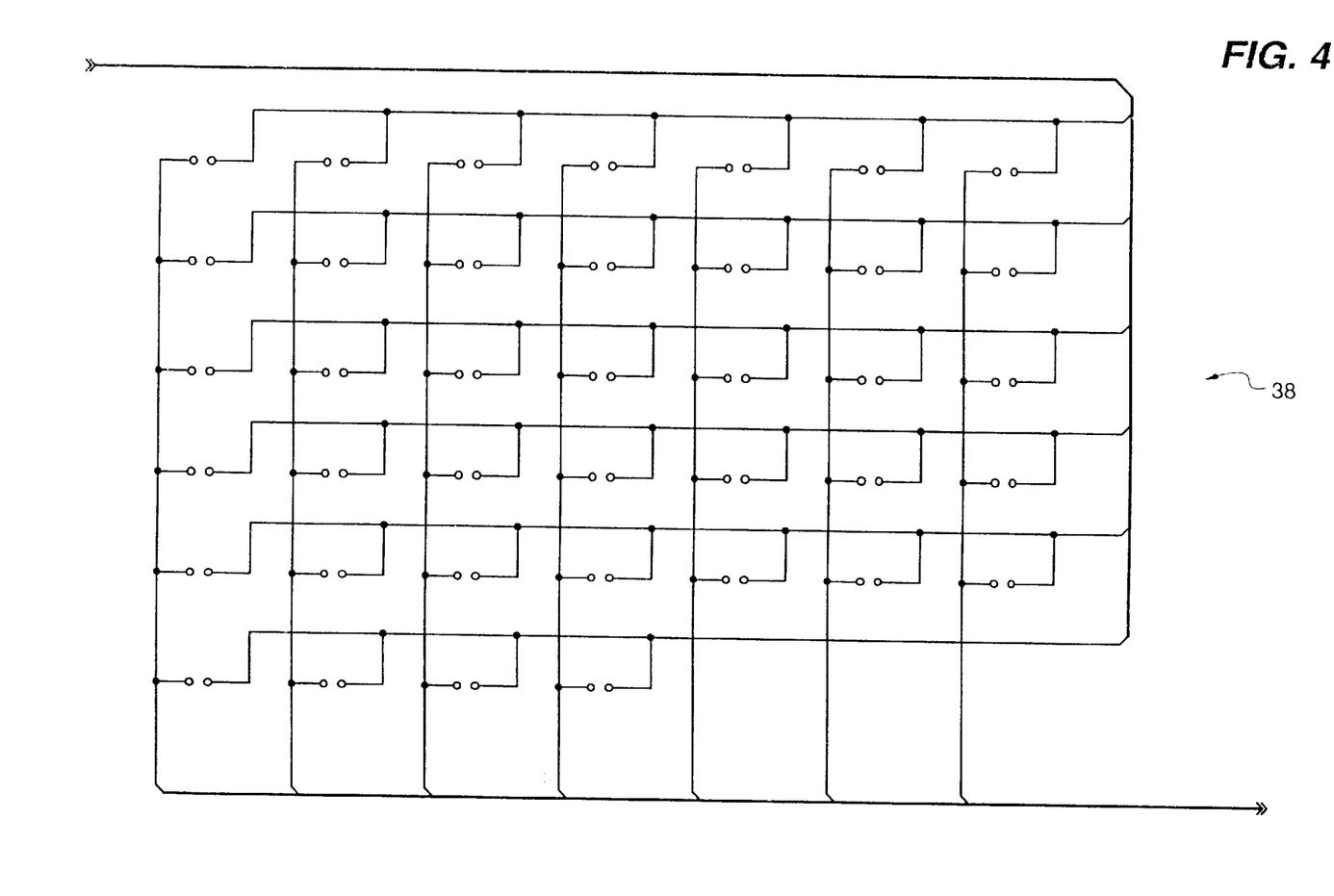
FIG. 4 is a block schematic diagram of the keyboard circuit employed in the remote control shown in FIG. 1.

Referring now to FIG. 2, the remote control 10 includes electrical circuitry 26 comprising a microcontroller or microprocessor 28 supplied by a power supply 30 and supervisory circuits 31 including batteries 32 which is also connected to an IR transmitting circuit 34 and receiving circuit 35.

Also connected to the microprocessor 28 is an EEPROM 36 and a keyboard circuit 38.

A ROM/RAM circuit 40 is coupled to a bus 42 that is connected to the microprocessor 28 and to an LCD driver circuit 44.

If desired, a motion detect circuit 46 can also be connected to the microprocessor 28.

In some embodiments an RF transceiver 48 is provided coupled to the microprocessor 28 and in some embodiments a sound or speech synthesizing chip 50 is provided connected to a speaker 51 and to the microprocessor 28.

Further, a smart card or credit card reader 52 can be included in the remote control 10, if desired.

Still further, a vibrating mechanism 55 can be provided to produce tactile sensations from the remote control 10 to the user.

As shown in FIG's. 3A–3D, the supervisory circuits 31 include a reset circuit 53 and a power decoupling circuit 54. The electrical circuitry 26 further includes an oscillator 56 coupled to the microprocessor 28 and an RS 232 serial port 58.

In the operation of a remote control, such as the remote control 10, conventional operations are typically performed with the remote control 10.

Figure 5:
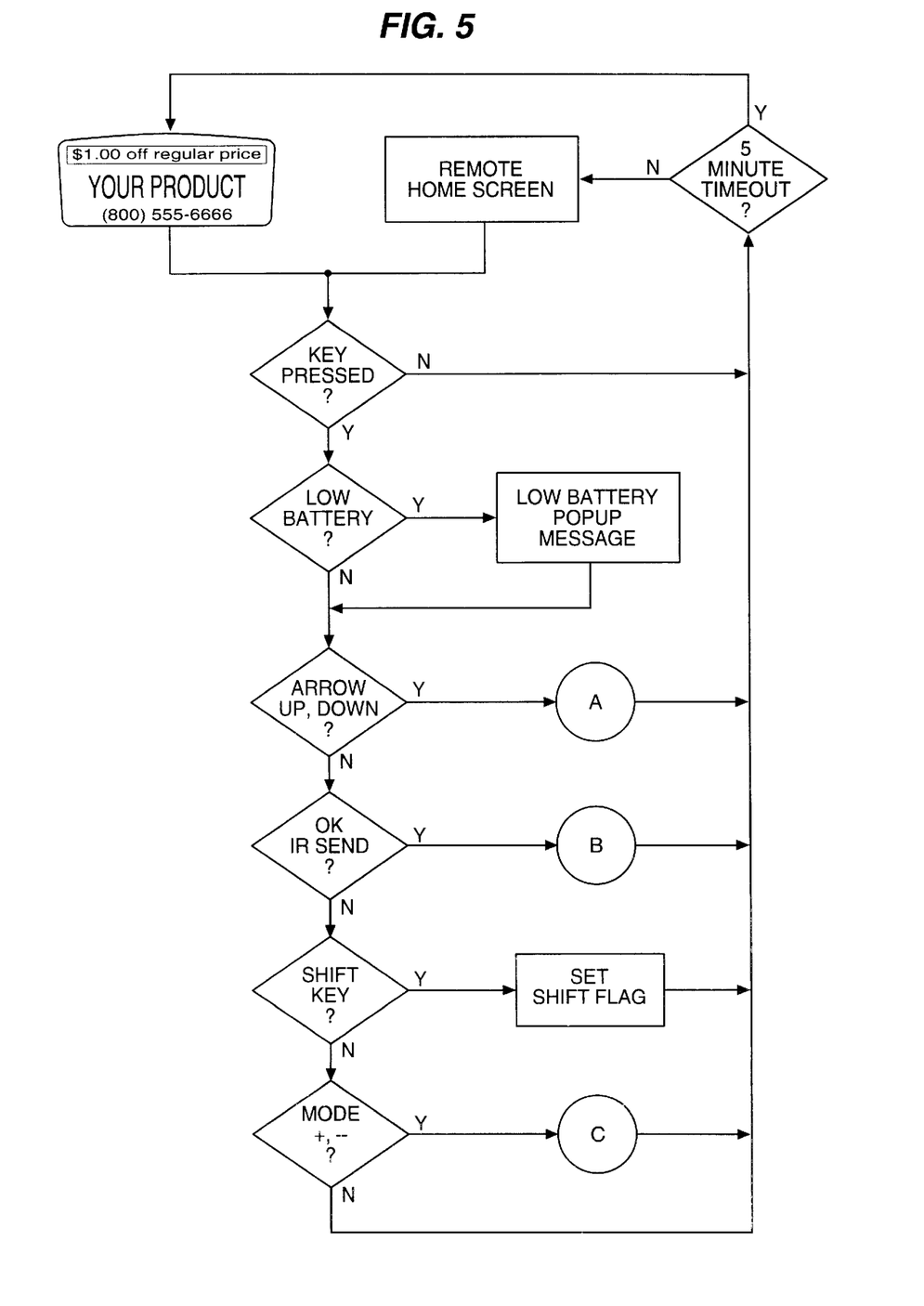
FIG. 5 is a flow chart of the basic operating subroutines of the remote control shown in FIG. 1 and shows a default procedure from each subroutine, namely a five minute timeout back to the display of an advertisement on the visual display of the remote control.

The software protocol stored in the ROM/RAM 40 of the remote control 10 is illustrated in FIG. 5, where the visual display 14 is defined as a Graphical Home Screen.

According to the teachings of the present invention, the remote control 10 is programmed so that an advertisement is displayed on this screen when the remote control 10 is not being used or is otherwise in a quiescent state.

In this respect, as shown in FIG. 5, when a key on the keyboard 15 is pressed, a determination is made as to which key has been pressed. If it is the Arrow Up or Down key, the program goes to subroutine A. If the key depressed is an IR sending key, the program goes to subroutine B.

Then, if the key depressed is the SHIFT key, the program sets a shift flag. After the next key press, if the shift flag is set, the subroutine goes to the routine shown in FIG. 6 and sends the function associated with the shifted key, as shown. If the SHIFT key is held for five seconds, or depressed a second time, the remote control 10 will go to a setup menu, such as setup menu of the type which is known in the field of control systems for television sets via remote controls. If not, the program goes to the MODE decision diamond in FIG. 5, as shown.

Figure 6:
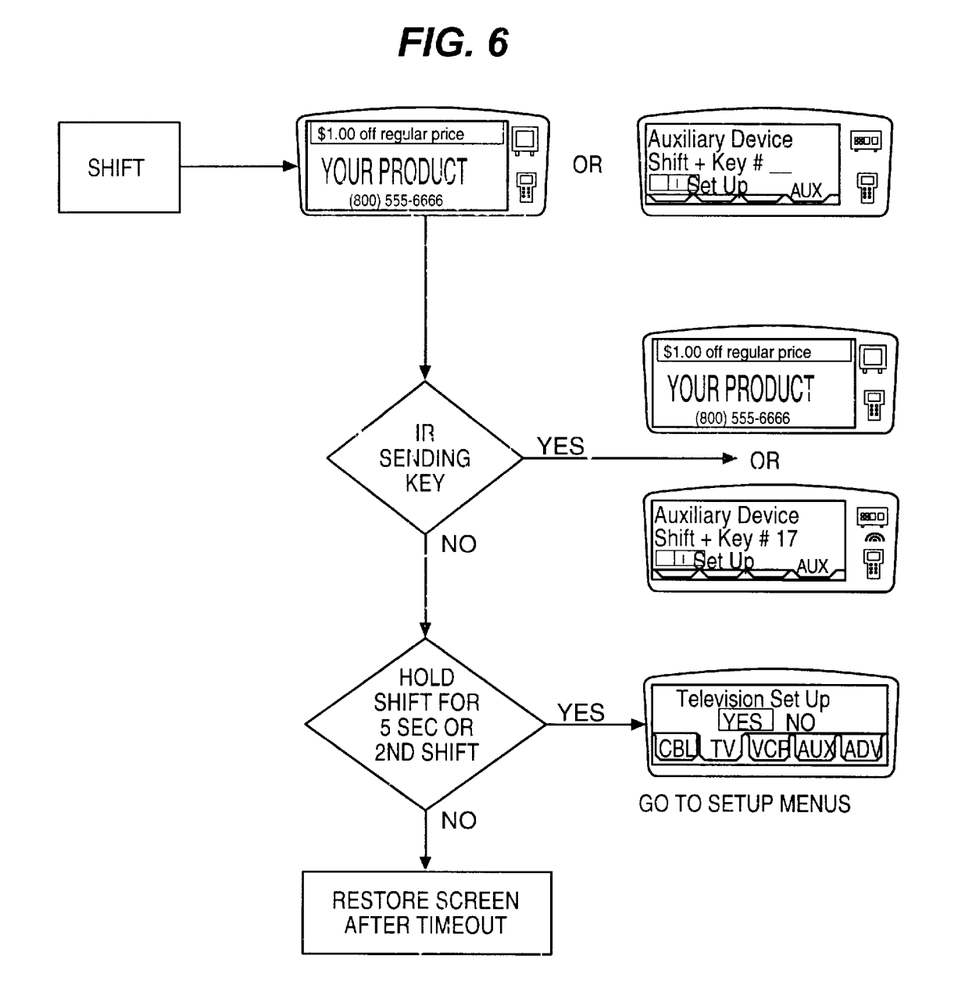
FIG. 6 is a flow chart of the "SHIFT" subroutine shown in FIG. 5.

It is to be understood that an important feature of the present invention is the "restore screen after timeout sequence" which is shown at the end of each of the subroutines A–G in FIG. 5 and at the end of the subroutine shown in FIG. 6.

Figure 7:
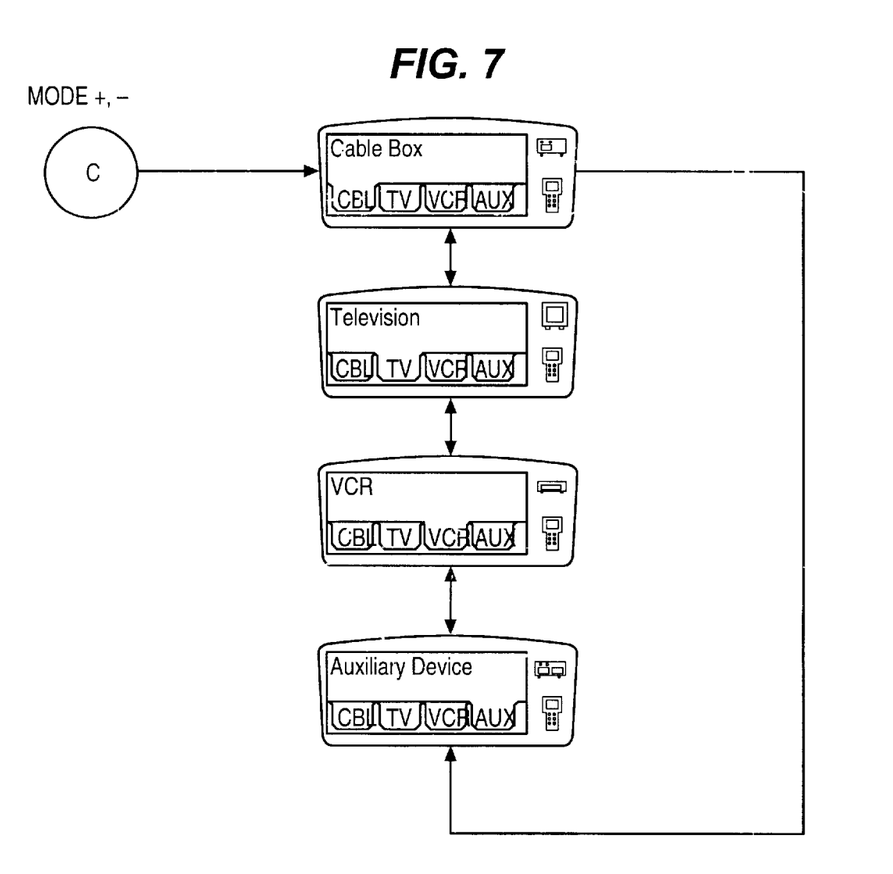
FIG. 7 is a flow chart of the "MODE" subroutine C shown in FIG. 5.
Figure 8:
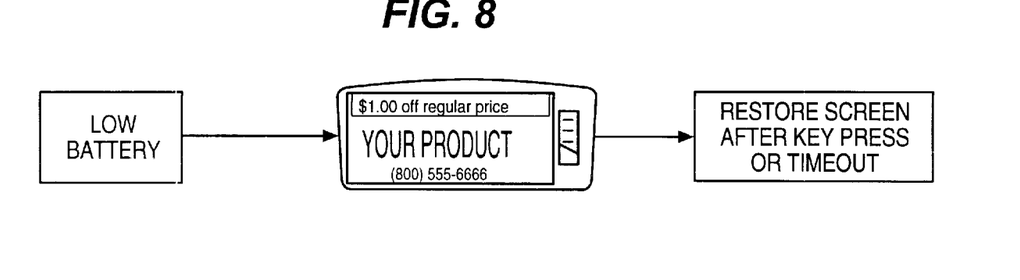
FIG. 8 is a flow chart of the "LOW BATTERY" subroutine shown in FIG. 5.

Now, as shown in FIG. 7, when the MODE key is pressed, the remote control program goes to a cable box menu or a television menu or a VCR menu or auxiliary device menu and can be cycled through these menus upon depression of the MODE key, Up or Down, +–, as indicated.

Then, as shown in FIG. 5, if the batteries are low, a subroutine will go through a "low battery sequence" which "pops up" a low battery message for three seconds while the key press is being processed.

The remote control 10 can be constructed, arranged and programmed to have or provide a number of features. For example, the software can maintain a display of selected information on the visual display even when the remote control 10 is in a quiescent state or turned off.

It will be understood that the host device with which the remote control 10 communicates, either by IR (34, 35) or by RF (48), to receive or transmit information, can be a cable decoder box, a satellite decoder box, a telephone company decoder box, a television set or a computer.

The wireless RF transmitting and receiving circuitry 48 can be constructed and arranged to receive RF data from a long range transmitting device such as a paging network, a FM/SCA, a cellular phone, digital communication systems such as PCS, PDM, CDM or other RF transmitting device.

If desired, the remote control 10 can be constructed and arranged to exchange information with a modem and the intelligence for operating the modem can be in the remote control 10. See U.S. Pat. No. 5,537,463 to Escobosa and Darbee.

The memory, RAM/ROM 40, of the remote control 10 can include a buffer memory capable of storing information for being displayed under command from a realtime clock in the remote control 10 and the remote control 10 can include software and or hardware for querying the host device for date/time information.

The visual display 14 can be bistable, thereby requiring no refresh buffer and requiring no power to maintain an image on the visual display 14.

The information received from the host device can be in compressed form, can be in the form of drawing commands, such that the software includes instructions for executing the drawing commands by drawing an image on the visual display 14 and/or can be a subset of an electronic program guide for display on the visual display 14 of the remote control 10.

The software for detecting a low-battery condition can include instructions for displaying an advertisement to replace the batteries with a specific brand of battery.

If desired, back-lighting can be provide for illuminating the visual display 14 or the keys on the keyboard 15. See U.S. Pat. No. 5,568,367 to Park.

Also, if desired, the remote control 10 can include circuitry 50, 51 for producing sound.

Further, the remote control 10 can include a reader 52 and associated circuitry for reading the magnetic stripe on a credit card or for reading or interfacing with a smart card containing a computer chip. See U.S. Pat. No. 5,603,078 to Henderson et al. or U.S. Pat. No. 5,532,689 to Bueno.

The motion detect circuit 46 can be used to place the remote control 10 in a given state when it is picked up by a user.

The operating software for the remote control 10 can be programmed to cycle a buffer memory in the ROM/RAM 40 to display on the visual display 14 multiple categories of information.

The IR receiving circuit 34 can be constructed to receive light signals from a TV screen (VEIL technology) or other form of flashing from the TV screen using visible light (TIMEX technology).

The remote control 10 can including pointing device circuitry for moving a cursor on the visual display 14 or a host display. See U.S.S.N. 08/605,546 for: SYSTEM FOR PROVIDING WIRELESS POINTER CONTROL.

The visual display 14 can include a touch-sensitive display screen or touch sensitive pads/keys on the back of the hand held remote control 10 beneath the visual display 14. See Goldstein U.S. Pat. No. 5,410,326.

An important feature of the remote control 10 disclosed herein is its ability to keep an advertisement on the display 10 and in front of a user. An ancillary feature is the ability of the remote control 10 not only to display the advertisement, but also to have an input, such as certain keys on the keyboard for enabling a user to respond to a displayed advertising offer via the wireless, IR or Rf communications link using the certain keys.

The received, and perhaps displayed, information can comprise: advertising formatted the same way as a banner on a page on the world wide web; a "trailer" from an advertisement appearing on a host device, thus giving the user more time to respond to an offer in the advertisement; games which can be played on the remote control 10; codes for upgrading the remote control 10; instructions for setting up the remote control 10; names of manufacturers electronic equipment to be controlled by the remote control 10 instead of model numbers or arbitrary code numbers; instructions for setting up the remote control 10 with the ability to display key labels indicating which function the remote control 10 is controlling when the user presses a key on the keyboard 15 of the remote control 10; a user guide and/or context-sensitive help for display on the visual display 14 of the remote control 10; and, executable code to be run on the remote control 10.

From the foregoing description, it will be apparent that the two-way remote control 10 with advertising display of the present invention has a number of advantages, some of which have been described above and others of which are inherent in the invention. Also it will be understood that modifications can be made to the remote control described above without departing from the teachings of the present invention. Accordingly, the scope of the invention is only to be limited as necessitated by the accompanying claims.

We claim:

1. A remote control including a visual display, wireless means for receiving from a host device data including selected information to be displayed, stored, or processed, wireless means for sending information, control means including software, circuitry for controlling operation of said remote control and means for maintaining said selected information displayed on said visual display when said remote control is not being used by a user to perform a function, and said software including means for detecting a low-battery condition, and means for displaying an advertisement to replace the batteries with a specific brand of battery.

2. A remote control including a visual display, wireless means for receiving from a host device data including selected information to be displayed, stored, or processed, wireless means for sending information, control means including software and circuitry for controlling operation of said remote control, means for maintaining said selected information displayed on said visual display when said remote control is not being used by a user to perform a function, and motion detection means for placing said remote control in a given state when it is picked up by a user.

3. A remote control including a visual display, wireless means for receiving from a host device data including selected information to be displayed, stored, or processed, wireless means for sending information, control means including software and circuitry for controlling operation of said remote control, means for maintaining said selected information displayed on said visual display when said remote control is not being used by a user to perform a function, and some of the selected information including names of manufacturers of electronic equipment to be controlled by said remote control instead of model numbers or arbitrary code numbers.

4. A remote control including a visual display, wireless means for receiving from a host device data including selected information to be displayed, stored, or processed, wireless means for sending information, control means including software and circuitry for controlling operation of said remote control, means for maintaining said selected information displayed on said visual display when said remote control is not being used by a user to perform a function, and said software including a display default routine and a timeout routine for timing out the time after the last function performed with the remote control by a user thereof and for then placing the visual display in the display default routine for displaying said selected information.

5. The remote control of claim 4 wherein said time out routine times out in 1 second to 10 minutes.

6. The remote control of claim 4 wherein said time out routine times out in approximately 5 minutes.

7. A remote control including a visual display, wireless means for receiving from a host device data including selected information to be displayed, stored, or processed, wireless means for sending information, control means including software and circuitry for controlling operation of said remote control, means for maintaining said selected information displayed on said visual display when said remote control is not being used by a user to perform a function and a vibrating mechanism for producing tactile sensations from the remote control which can be sensed by a user.

\* \* \* \* \*